July 1, 1930.  T. T. GRAY  1,768,683
REFINING HYDROCARBONS
Filed Nov. 12, 1926
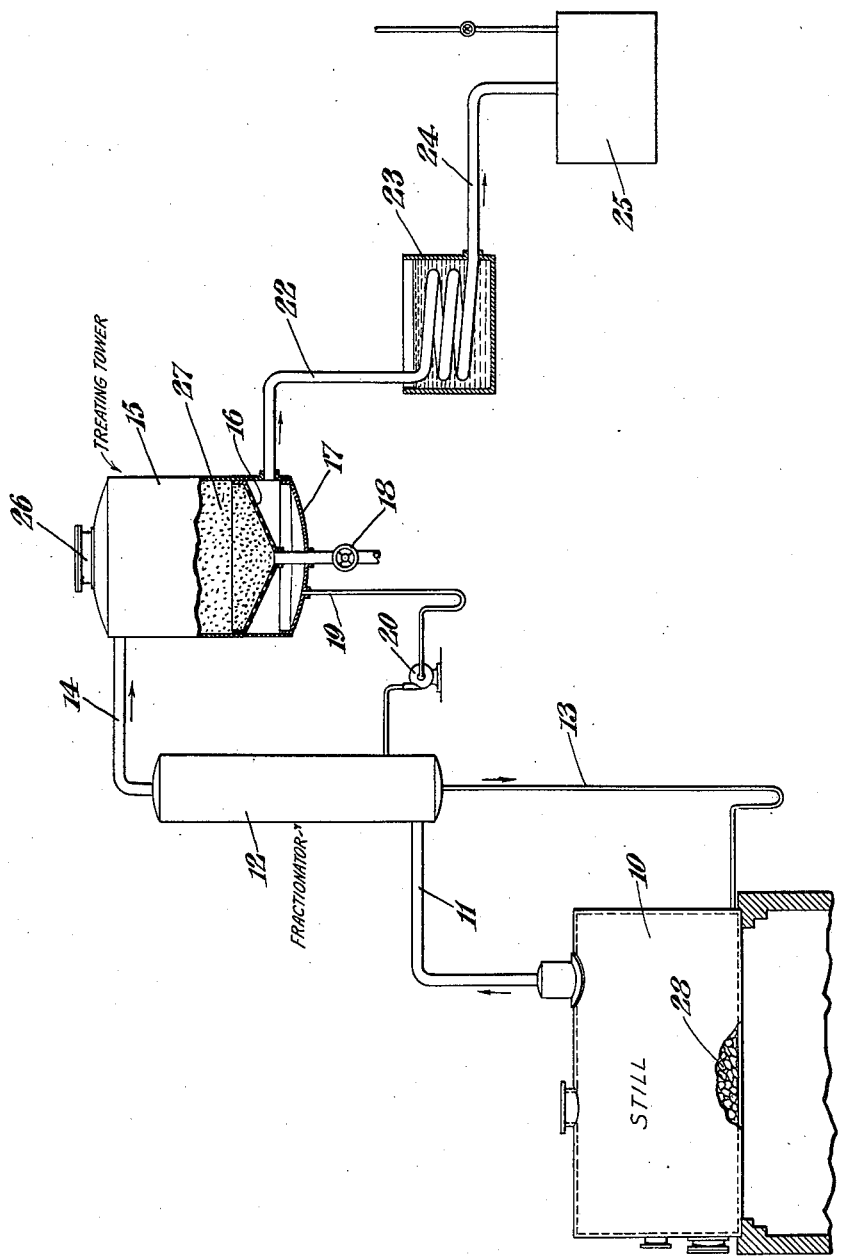
Inventor
Thomas T. Gray
By his Attorneys
Kenyon & Kenyon Patented July 1, 1930

1,768,683

UNITED STATES PATENT OFFICE

THOMAS T. GRAY, OF ELIZABETH, NEW JERSEY, ASSIGNOR TO GRAY PROCESSES CORPORATION, OF NEWARK, NEW JERSEY, A CORPORATION OF DELAWARE

REFINING HYDROCARBONS

Application filed November 12, 1926. Serial No. 147,866.

This invention relates to refining hydrocarbon products and has for an object a method of obtaining stable "doctor sweet" products from sour unstable hydrocarbons, such, for example, as distillates obtained by cracking oils containing sulphur.

Certain of these distillates are very difficult to treat satisfactorily by the methods heretofore known to the art, as in order to obtain sweet products that are stable, it has been necessary to subject them to an involved chemical treatment using in the various steps sulphuric acid and sodium plumbite solutions followed by a carefully-controlled distillation. Moreover, such treatment, in addition to being costly, results in a considerable loss of valuable product, especially where the material treated is a cracked distillate containing a large proportion of gasoline such as is obtained from any of the commercial cracking processes. These products when made from oils containing even small amounts of sulphur almost invariably contain mercaptans which cause them to react sour to the doctor test and also contain unstable unsaturated hydrocarbons which tend to produce instability and gum formation in the gasoline.

In my United States Patent 1,340,889, I have disclosed a method of removing the unstable hydrocarbons present in the cracked distillate by contacting them in vapor form with a catalytic treating material, thereby causing polymerization of the unstable constituents, and then separating the vapors from the polymers. However, where it is desired to obtain a sweet product, the refined distillates require a subsequent treatment which has heretofore been effected with sodium plumbite and sulphur or with a hypochlorite solution. In certain cases, this has resulted, due to the introduction of sulphur, partial oxidation or to other causes, in diminishing somewhat the stability of the product when exposed to strong sunlight.

I have discovered that by distilling sour cracked hydrocarbon products in contact with a salt such as copper acetate or mercuric acetate which has the property of forming addition compounds with organic sulphur compounds and passing the distillate in vapor form into contact with a solid catalytic material in the manner described in the aforesaid patent, a product is obtained which is sweet, non-corrosive, stable to light and free of the tendency to deposit gums on standing and in use.

I am aware that certain metals and other compounds other than those above enumerated as having the property of forming addition compounds with organic sulphur compounds have been used for removing sour constituents from petroleum oils. However, in the case of cracked products, distilling with such salts and subsequent contact of the vapors with a solid catalytic material to polymerize the unstable constituents results in a sour product. This is undoubtedly due to a side reaction, the nature of which is not entirely clear. The result is partly due, apparently, to the decomposition in contact with the catalytic material of the disulphides formed in the sweetening step and their reconversion to mercaptans which render the product sour. In the case of copper and mercuric acetate, the side reaction does not take place and the product after being refined in the vapor phase as described is sweet as well as stable and is comparatively free of compounds causing gum deposition.

Referring now to the drawings, the single figure discloses an apparatus suited to carrying out the process.

A still 10 is provided which may be heated in any suitable manner. From the top of the still, a pipe 11 leads to a fractionator 12 into which vapors are conducted from the still by the pipe 11. From the bottom of the fractionator 12, a reflux pipe 13 leads back to the still 10. A pipe 14 leads from the top of the fractionator 12 to a treating tower 15 in which is arranged a funnel-like perforated shelf 16, the spout of which comprises a pipe 17 extending through the bottom of the tower 15 and controlled by the valve 18. A reflux pipe 19 leads from the bottom of the tower 15 to the fractionator 12, there being provided in the pipe 19 a pump 20 and a trap 21. From a point below the shelf 16, a pipe 22 leads to a condenser 23 from which a pipe 24 leads to a storage tank 25. To carry out the process, the tower 15 is charged through the manhole 26 with a supply 27 of solid adsorptive material, such as fuller's earth, bauxite or other catalytic material, capable of polymerizing the unstable, unsaturated hydrocarbons present in cracked hydrocarbon products. This material is prevented from sifting through the perforations in the shelf 16 by a layer of wire screen, mineral wool or the like. The still 10 is charged with the hydrocarbons to be treated, which may be cracked distillate obtained from oil containing sulphur or may be other hydrocarbon products containing unstable, unsaturated hydrocarbons as well as sour sulphur compounds. Also in the still 10 is provided a supply 28 of sweetening material which may be copper or mercury acetate or a similar substance capable of forming addition compounds with organic sulphur compounds. This material may be suspended in the liquid or may simply be deposited on the bottom of the vessel containing the liquid.

The oil in the distillation system is heated to vaporizing temperature and the vapors led through the pipe 11 to the tower 12 where they are fractionated. Distilling the oil in contact with the material 28 converts the sour sulphur compounds into sweet sulphur compounds which will remain sweet when subsequently brought into contact with the polymerizing material. The heavier ends or condensates are refluxed to the still through the pipe 13. Vapor from the fractionator 12 is then passed to the treating tower 15 and brought into contact with the treating material 27. During this treatment the unstable, unsaturated hydrocarbons are polymerized and because of the higher boiling points of the polymers, the latter condense and drop through the perforations into the bottom of the treating tower. The treated vapor passes out through the pipe 22 to the condenser 23 where it is liquefied and from there to the tank 25. The polymers are refluxed from the tower 15 to the fractionator 12. The product thus obtained is a stable colorless sweet liquid. The amount of sweetening material used will vary with the product to be treated. Good results have been obtained by using 5% by weight of acetate.

While the process has been disclosed in connection with the re-running of cracked distillates it is obvious that it is not limited to any such use but may be made use of wherever sour sulphur compounds are present in hydrocarbons which or may not contain unstable hydrocarbon compounds. Moreover the apparatus used may be considerably varied. The still may be an ordinary shell still, a pressure still, a pipe still or any vessel from which vaporization takes place. The fractionator may be of any suitable design and the treating tower may be of other design than that here shown without any way departing from the spirit of the invention.

What I claim as new and desire to secure by Letters Patent of the United States is:

1. The method of refining a hydrocarbon product containing sour sulphur compounds and unstable hydrocarbons which comprises contacting the product in liquid form with a metallic acetate capable of forming addition compounds with the sulphur compounds and then contacting the product in vapor form with a solid adsorptive material capable of polymerizing unstable hydrocarbon compounds.

2. The process of refining a hydrocarbon product containing sour sulphur compounds and unstable hydrocarbon compounds which comprises distilling the product in the presence of a metallic acetate capable of forming addition compounds with the sulphur compounds and bringing the vaporized product into contact with a solid adsorptive catalyst.

3. The process of refining a hydrocarbon product containing sour sulphur compounds and unstable hydrocarbon compounds which comprises contacting the product in liquid form with copper acetate and then contacting the product in vapor form with a solid adsorptive catalyst.

4. The process of refining a hydrocarbon product containing sour sulphur compounds and unstable hydrocarbon compounds which comprises distilling the product with copper acetate to sweeten the sour sulphur compounds and contacting the vaporized product with an adsorptive catalyst capable of polymerizing the unstable hydrocarbons.

5. The process of obtaining a refined hydrocarbon product from hydrocarbons containing sour sulphur compounds which comprises cracking the hydrocarbons and contacting the same in liquid phase with a metallic acetate capable of forming addition compounds with the sulphur compounds and then contacting the product in vapor form with solid adsorptive material capable of polymerizing unstable hydrocarbon compounds.

In testimony whereof, I have signed my name to this specification.

THOMAS T. GRAY.